United States Patent
Van Do et al.

(10) Patent No.: US 7,491,452 B2
(45) Date of Patent: Feb. 17, 2009

(54) PERPENDICULAR MAGNETIC RECORDING DISK WITH RECORDING LAYER CONTAINING SELECTED METAL OXIDES AND FORMED ON A REDUCED-THICKNESS EXCHANGE-BREAK LAYER

(75) Inventors: Hoa Van Do, Fremont, CA (US); Bernd Heinz, San Jose, CA (US); Yoshihiro Ikeda, San Jose, CA (US); Kentaro Takano, San Jose, CA (US); Min Xiao, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 641 days.

(21) Appl. No.: 11/203,360

(22) Filed: Aug. 12, 2005

(65) Prior Publication Data

US 2007/0037016 A1    Feb. 15, 2007

(51) Int. Cl.
*G11B 5/66*    (2006.01)
(52) U.S. Cl. .................................... 428/832.1
(58) Field of Classification Search ........................ None
See application file for complete search history.

(56) References Cited

U.S. PATENT DOCUMENTS

| | | | |
|---|---|---|---|
| 5,062,938 A | 11/1991 | Howard | |
| 5,066,552 A | 11/1991 | Howard et al. | |
| 5,478,661 A | 12/1995 | Murayama et al. | |
| 5,679,473 A | 10/1997 | Murayama et al. | |
| 5,919,581 A | 7/1999 | Yamamoto et al. | |
| 6,177,208 B1 | 1/2001 | Yamamoto et al. | |

(Continued)

FOREIGN PATENT DOCUMENTS

| | | |
|---|---|---|
| JP | 2003313659 A | 11/2003 |
| WO | 2004064048 A | 7/2004 |
| WO | 2005031713 A | 4/2005 |

OTHER PUBLICATIONS

Uwazumi, et al., "CoPtCr-SiO2 Granular Media for High-Density Perpendicular Recording", IEEE Transactions on Magnetics, vol. 39, No. 4, Jul. 2003, pp. 1914-1918.

(Continued)

*Primary Examiner*—Holly Rickman
(74) *Attorney, Agent, or Firm*—Thomas R. Berthold (57) ABSTRACT

A perpendicular magnetic recording disk has a granular Co-based ferromagnetic alloy recording layer (RL) with oxides of a selected metal (Ta or Nb) and a reduced-thickness exchange-break layer (EBL) between the RL and the soft magnetic underlayer (SUL). A perpendicular magnetic recording system that includes the disk, the write head and the read head, has an improved ability to write to the RL because of the reduced-thickness EBL.

7 Claims, 7 Drawing Sheets

U.S. PATENT DOCUMENTS

| | | |
|---|---|---|
| 6,686,070 B1 | 2/2004 | Futamoto et al. |
| 6,696,172 B2 | 2/2004 | Oikawa et al. |
| 6,777,077 B2 | 8/2004 | Lee et al. |
| 6,835,475 B2 | 12/2004 | Carey et al. |
| 2003/0152809 A1 | 8/2003 | Oikawa et al. |
| 2003/0157375 A1 | 8/2003 | Uwazumi et al. |
| 2004/0027868 A1 | 2/2004 | Nakamura et al. |
| 2004/0185308 A1 | 9/2004 | Kida et al. |
| 2005/0058855 A1 | 3/2005 | Girt |

OTHER PUBLICATIONS

Zheng et al., "Role of Oxygen Incorporation in Co-Cr-Pt-Si-O Perpendicular Magnetic Recording Media", IEEE Transactions on Magnetics, vol. 40, No. 4, Jul. 2004, pp. 2498-2500.

Chiba et al., "Structure and magnetic properties of Co-Pt-Ta2O5 film for perpendicular magnetic recording media", J of Mag and Magn Mater, vol. 287, Feb. 2005, pp. 167-171.

Inaba, "Optimization of the SiO2 Content in CoPtCr-SiO2 Perpendicular Recording Media for High-Density Recording", IEEE Trans Magn, vol. 40, No. 4, Jul. 2004, pp. 2486-2488.

EPO Search Report, EP, Dec. 28, 2005.

PERPENDICULAR MAGNETIC RECORDING DISK WITH RECORDING LAYER CONTAINING SELECTED METAL OXIDES AND FORMED ON A REDUCED-THICKNESS EXCHANGE-BREAK LAYER

RELATED APPLICATION

This application is related to pending application Ser. No. 11/135,750 filed May 24, 2005 and titled "PERPENDICULAR MAGNETIC RECORDING DISK WITH IMPROVED RECORDING LAYER HAVING HIGH OXYGEN CONTENT".

BACKGROUND OF THE INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Figure 1:
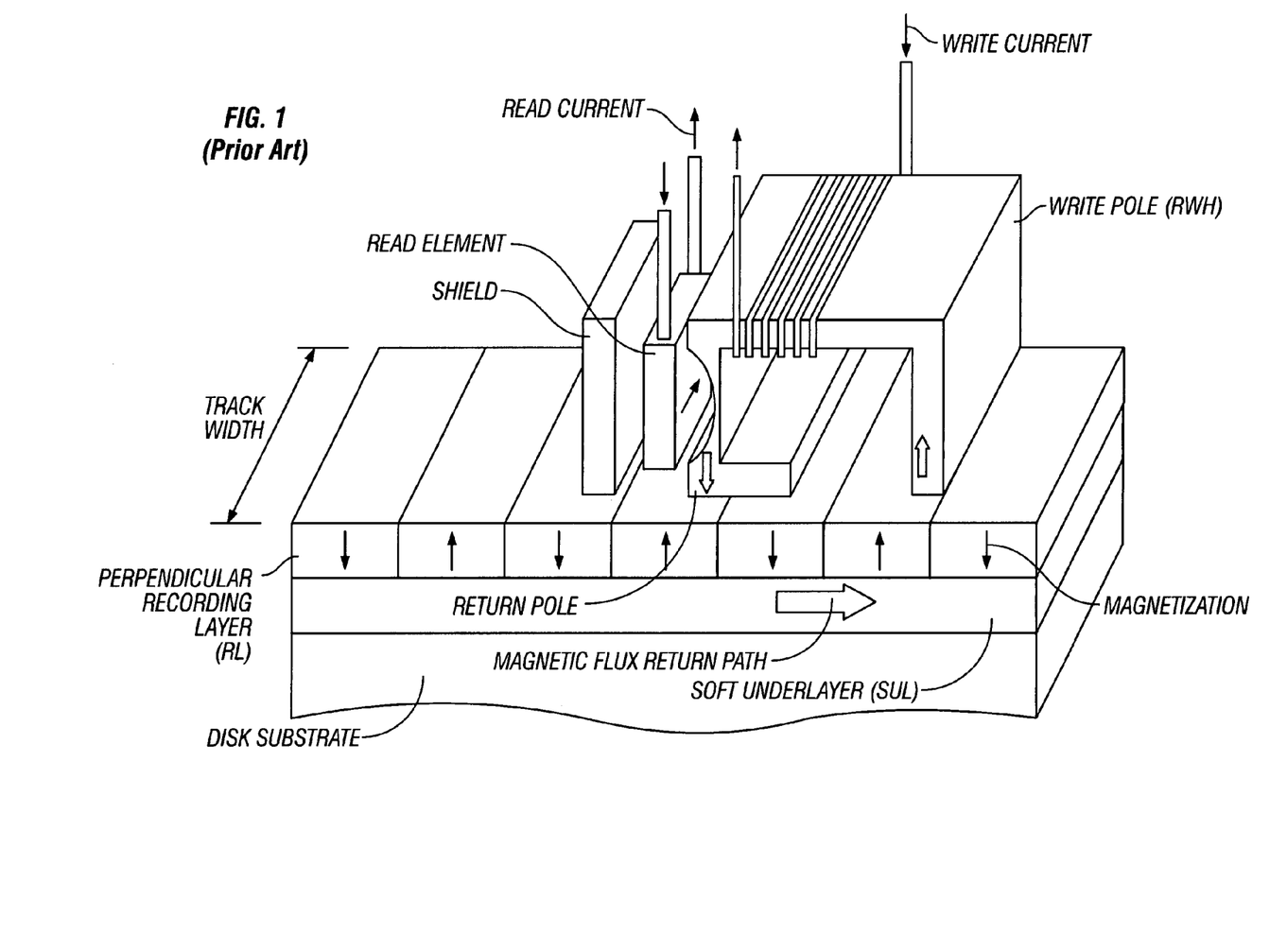
FIG. 1 is a schematic of a prior art perpendicular magnetic recording system.

Perpendicular magnetic recording, wherein the recorded bits are stored in a perpendicular or out-of-plane orientation in the recording layer, is a promising path toward ultra-high recording densities in magnetic recording hard disk drives. A common type of perpendicular magnetic recording system is one that uses a "dual-layer" media. This type of system is shown in FIG. 1 with a single write pole type of recording head. The dual-layer media includes a perpendicular magnetic data recording layer (RL) formed on a "soft" or relatively low-coercivity magnetically permeable underlayer (SUL). The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

Figure 2:
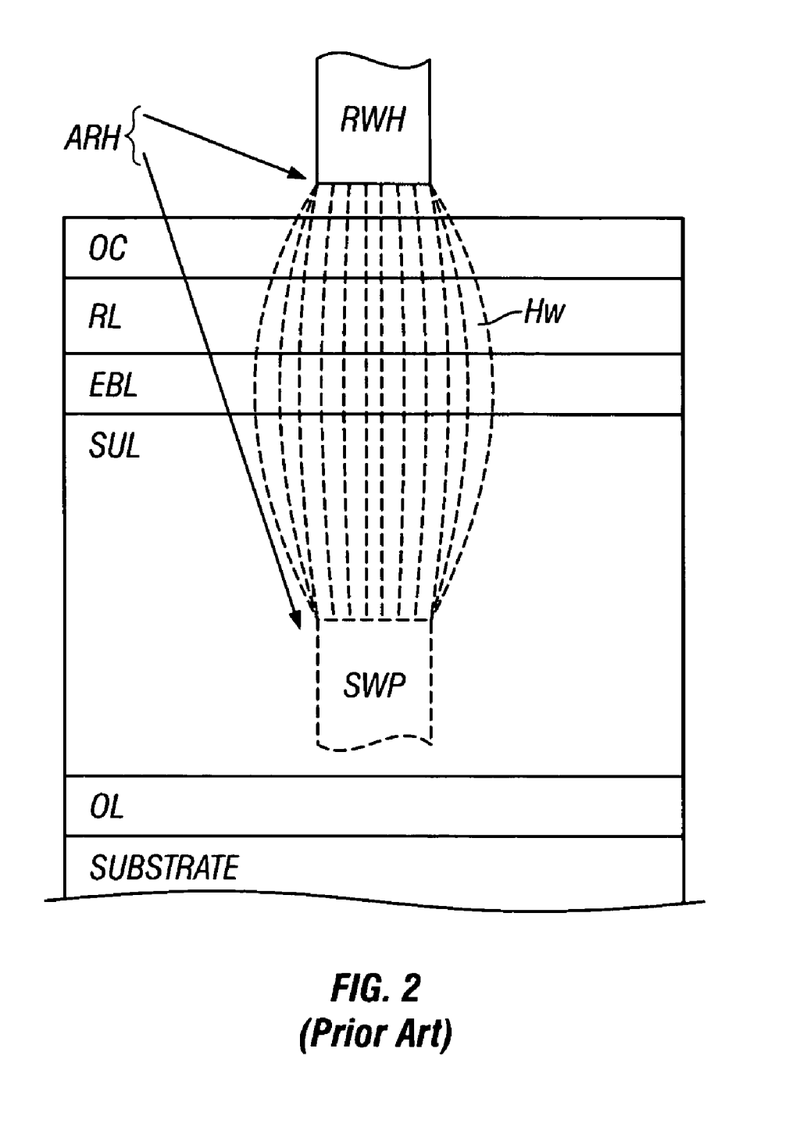
FIG. 2 is a schematic of a cross-section of a perpendicular magnetic recording disk according to the prior art and depicting the write field.

FIG. 2 is a schematic of a cross-section of a prior art perpendicular magnetic recording disk showing the write field $H_w$ acting on the recording layer RL. The disk also includes the hard disk substrate, a seed or onset layer (OL) for growth of the SUL, a nonmagnetic exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and an effective secondary write pole (SWP) beneath the RL. The SWP is facilitated by the SUL, which is decoupled from the RL by the EBL and by virtue of its high permeability produces a magnetic mirror image of the RWH during the write process. This effectively brings the RL into the gap of the ARH and allows for a large write field $H_w$ inside the RL.

One type of material for the RL is a granular ferromagnetic cobalt alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity ($H_c$) media and to reduce inter-granular exchange coupling, which is responsible for high intrinsic media noise. Thus, enhancement of grain segregation in the cobalt alloy RL has been proposed by the addition of oxides, including oxides of Si, Ta and Nb, which precipitate to the grain boundaries.

Figure 3:
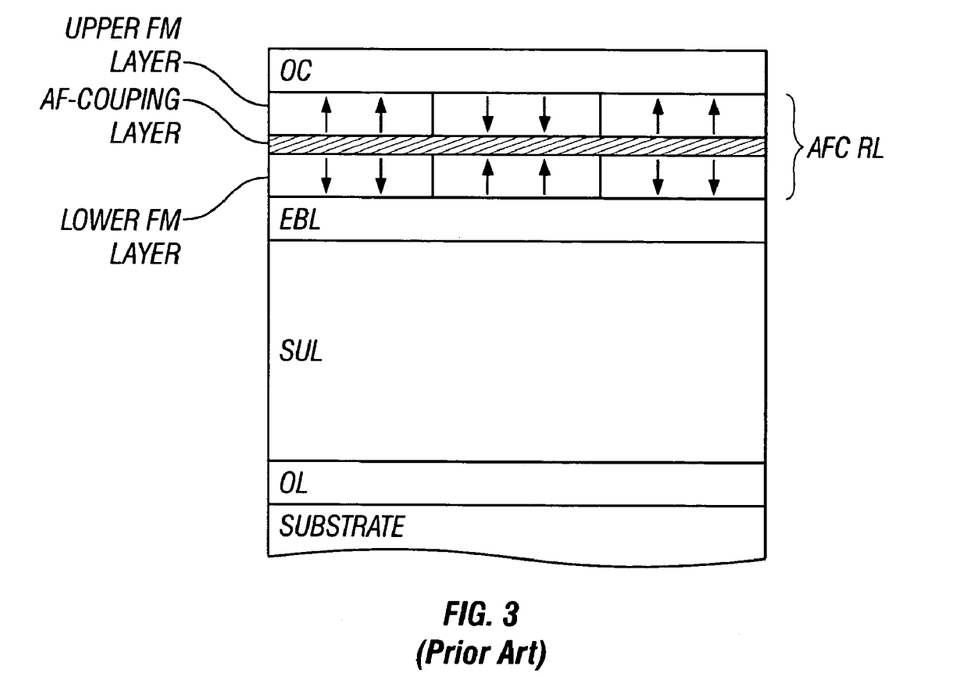
FIG. 3 is a schematic of a cross-section of a perpendicular magnetic recording disk having an antiferromagnetically-coupled (AFC) recording layer according to the prior art.

A perpendicular magnetic recording medium has also been proposed wherein the RL is an antiferromagnetically-coupled (AFC) recording layer of two ferromagnetic layers, each having perpendicular magnetic anisotropy, separated by an antiferromagnetically (AF) coupling layer. The AF-coupling layer induces perpendicular antiferromagnetic exchange coupling between the two ferromagnetic layers, as depicted in FIG. 3 by the antiparallel magnetization directions between the two ferromagnetic layers in each magnetized region of the AFC RL. The upper ferromagnetic layer is formed with a higher magnetic moment than the lower ferromagnetic layer, typically by making it thicker, so that the AFC RL has a net magnetic moment in the absence of a magnetic field. In this type of medium, as described in U.S. Pat. No. 6,815,082 B2, both the first or lower ferromagnetic layer and the second or upper ferromagnetic layer are formed of a granular cobalt alloy, such as a CoPtCr alloy, with an hcp crystalline structure and with or without oxides.

The cobalt alloy RL, including the cobalt alloy AFC RL, with or without oxides, has out-of-plane of perpendicular magnetic anisotropy as a result of the c-axis of its hcp crystalline structure being induced to grow perpendicular to the plane of the layer during deposition. To induce this growth of the hcp RL, the EBL onto which the RL is formed is also an hcp material. In a perpendicular magnetic recording medium with an AFC RL, the EBL also has an hcp crystalline structure to induce the perpendicular magnetic anisotropy of the lower layer in the AFC RL. Ruthenium (Ru) is one type of nonmagnetic hcp material proposed for the EBL. While not shown in FIG. 2, a seed layer is typically deposited directly on the SUL to facilitate the growth of the EBL.

To achieve high performance perpendicular magnetic recording disks at ultra-high recording densities, e.g., greater than 200 Gbits/in$^2$, the RL should exhibit low intrinsic media noise (high signal-to-noise ratio or SNR), a coercivity $H_c$ greater than about 5000 Oe and a nucleation field $H_n$ greater (more negative) than about −1500 Oe. The nucleation field $H_n$ has several meanings, but as used herein it is the reversing field, preferably in the second quadrant of the M-H hysteresis loop, at which the magnetization drops to 90% of its saturation value $M_s$. The more negative the nucleation field, the more stable the remanent magnetic state will be because a larger reversing field is required to alter the magnetization.

A perpendicular magnetic recording medium with a RL of a CoPtCr granular alloy with added SiO$_2$ is described by H. Uwazumi, et al., "CoPtCr—SiO$_2$ Granular Media for High-Density Perpendicular Recording", *IEEE Transactions on Magnetics*, Vol. 39, No. 4, July 2003, pp. 1914-1918. The RL had $H_c$ of about 4000 Oe and $H_n$ of about −700 Oe. A perpendicular magnetic recording medium with a RL of a CoPt granular alloy with added Ta$_2$O$_5$ is described by T. Chiba et al., "Structure and magnetic properties of Co—Pt—Ta$_2$O$_5$ film for perpendicular magnetic recording media", *Journal of Magnetism and Magnetic Materials*, Vol. 287, February 2005, pp. 167-171. The RL had $H_c$ of about 3000 Oe.

In perpendicular magnetic recording systems the recording medium is part of the write head and therefore needs to match with the head design, as depicted in FIG. 2 for a system with a single-write-pole head. For a single-write-pole head, it is desirable to minimize the write-pole-to-SUL spacing to concentrate the write field flux and thus maximize the write field. Another type of system uses a trailing-shield type of write head. In this system the write-pole-to-trailing-shield distance should match with the write-pole-to-SUL spacing to obtain the best write angle. In both systems, a thin EBL is used to achieve the desired head-to-SUL spacing. However, while a reduction in thickness of the EBL is desirable for writing, the EBL is made thick enough to provide the template for the growth of the hcp cobalt alloy RL to assure that its c-axis is perpendicular. The EBL is also sufficiently thick to provide an RL with high $H_c$ and low enough inter-granular exchange coupling to minimize the intrinsic media noise. The thickness of the EBL required for RLs with Si oxides is typically greater than about 20 nm. The RL with Ta oxides reported in the above-cited article by T. Chiba et al. had a Ru EBL with a thickness of 15 nm.

What is needed is a high-performance, ultra-high-recording-density perpendicular magnetic recording disk with a CoPtCr granular alloy RL and a thin EBL for optimal write performance.

SUMMARY OF THE INVENTION

The invention is a perpendicular magnetic recording disk with a recording layer (RL) having oxides of a selected metal and an exchange-break layer (EBL) with a reduced thickness, and a perpendicular magnetic recording system that includes the disk, the write head and the read head. The disk has improved writability and high readback signal amplitude. The RL is a granular Co-based ferromagnetic alloy with an oxide or oxides of one or more of Ta and Nb. The EBL on which the RL is grown is substantially thinner than the minimum required thickness of the EBLs for the RLs with oxides of segregants other than Ta an Nb. In one embodiment the RL has $H_c$ and $H_n$ comparable to RLs with oxides of other segregants, such as Si.

In one embodiment of the disk the RL is a granular CoPtCr ferromagnetic alloy with the inter-granular material made up of one or more oxides of Cr and one or more oxides of a single selected segregant, either Ta or Nb, with the amount of oxygen in the RL being between about 22 and 35 atomic percent. In this embodiment the EBL is Ru with a thickness greater than 8 nm and less than 14 nm. This disk exhibits a $H_c$ greater than 5000 Oe and an $H_n$ greater than −1500 Oe. By contrast, a comparison disk with similar structure, but with Si as the segregant in place of the Ta or Nb, exhibits similar values of $H_c$ and $H_n$, but requires a Ru EBL thickness of about 21 nm. In addition to improved writability due to the reduced-thickness EBL, the disk of this invention has significantly better SNR, higher readback signal amplitude and better error rate than the comparison disk.

For a fuller understanding of the nature and advantages of the present invention, reference should be made to the following detailed description taken together with the accompanying figures.

DETAILED DESCRIPTION OF THE INVENTION

Figure 4:
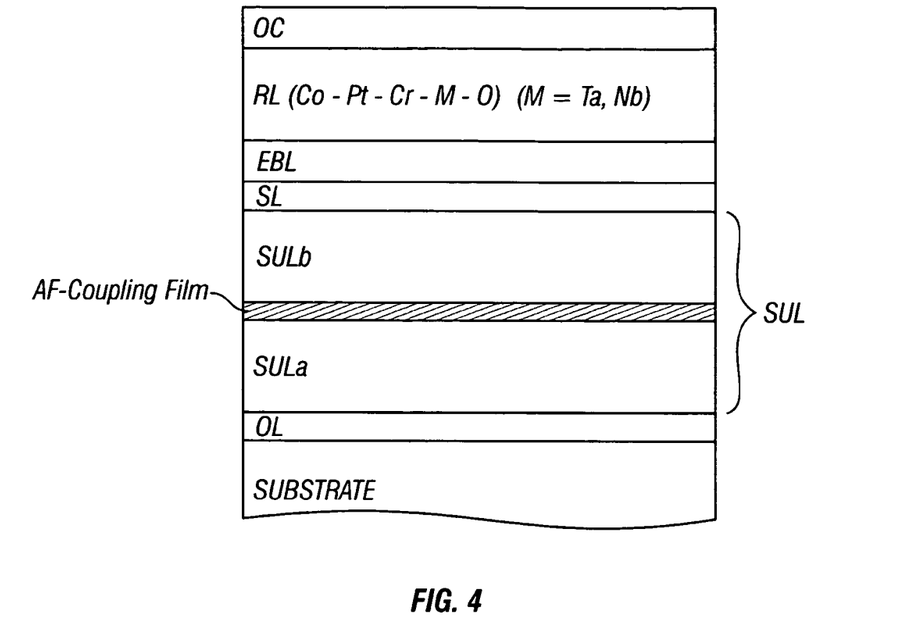
FIG. 4 is a schematic of a cross-section of a perpendicular magnetic recording disk according to the present invention.

The perpendicular magnetic recording disk according to the present invention is illustrated in FIG. 4. The structure is similar to the prior art structure of FIG. 2 except for the composition of the RL in combination with a reduced-thickness EBL.

Referring to FIG. 4, the various layers making up the disk are located on the hard disk substrate. The substrate may be any commercially available glass substrate, but may also be a conventional aluminum alloy with a NiP or other known surface coating, or an alternative substrate, such as silicon, canasite or silicon-carbide. The SUL is located on the substrate, either directly on the substrate or directly on an adhesion layer or OL. The OL facilitates the growth of the SUL and may be an AlTi alloy or a similar material with a thickness of about 2-5 nanometers (nm). The SUL is a laminated or multilayered SUL formed of multiple soft magnetic layers (SULa and SULb) separated by an interlayer film (such as Ru, Ir, or Cr) that acts as an antiferromagnetic (AF) coupling film to mediate antiferromagnetic exchange coupling between SULa and SULb. This type of SUL is described in U.S. Pat. Nos. 6,686,070 B 1 and 6,835,475 B2. The SUL may also be a single layer. The SUL may also be a laminated or multilayered SUL formed of multiple soft magnetic films separated by nonmagnetic films, such as films of carbon or SiN or electrically conductive films of Al or CoCr. The SUL layer or layers are formed of amorphous magnetically permeable materials such as alloys of CoNiFe, FeCoB, CoCuFe, NiFe, FeAlSi, FeTaN, FeN, FeTaC, CoTaZr, CoFeB, and CoZrNb. The thickness of the SUL is typically in the range of approximately 50-400 nm. The OC formed on the RL may be an amorphous "diamond-like" carbon film or other known protective overcoat, such as silicon nitride.

The nonmagnetic EBL on the SUL is a nonmagnetic metal or alloy having a hexagonal close-packed (hcp) crystal structure for controlling the hcp crystal orientation in the granular RL. The EBL promotes the growth of the hcp granular RL so that its c-axis is oriented substantially perpendicular, thereby resulting in perpendicular magnetic anisotropy. Ruthenium (Ru) is a commonly used material for the EBL, but other materials include a metal selected from Ti, Re, and Os, and an alloy containing at least one element selected from Ti, Re, Ru, and Os, including Ru-based alloys. If Ru is used as the EBL, it may be formed directly on a seed layer (SL) that is formed on the SUL, such as 1-2 nm thick layer of NiFe or a 2-4 nm thick layer of NiV or NiW. In the preferred embodiment of this invention the EBL is Ru with a thickness less than 15 nm, preferably greater than 8 nm and less than 14 nm.

The RL is a granular ferromagnetic Co alloy with inter-granular material made up of one or more oxides of one or more of an "M" segregant (where M is Ta or Nb). Preferably the M oxide or oxides in the inter-granular material is an oxide or oxides of just one element, i.e., either Ta—Ox or Nb—Ox. The RL may also contain Cr, with one or more oxides of Cr also being present as inter-granular material.

Various test disks were fabricated by sputter deposition with either Ta or Nb in the RL and with Ru EBLs of different thicknesses. The recording properties of the test disks were then compared with substantially identical disks, with the exception that Si instead of Ta or Nb was in the recording layer and the Ru EBL had a higher range of thicknesses. The disks had a structure like that depicted in FIG. 4, with 75 nm thick layers of CoTaZr as SULa and SULb, a 0.7 nm thick Ru layer as the AF-coupling film, a 2-4 nm thick layer of NiV as the SL for the growth of the Ru EBL, and a 14 nm thick RL.

Figure 5:
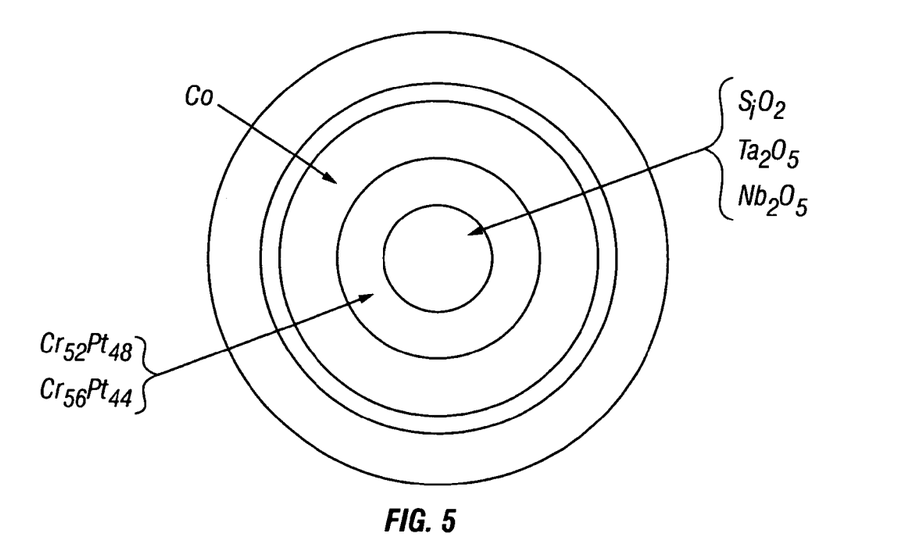
FIG. 5 is a view of the multi-target sputtering source and associated target compositions used to make the test disks of the present invention and the comparison disk.

The RLs were fabricated by reactive sputtering in an Ar/O2 gas mixture using a Unaxis® Triatron multi-target sputtering source. The sputtering source is shown in FIG. 5 and has three concentric targets, each with its own power supply. To make the various compositions the inner target was either $Ta_2O_5$ or $Nb_2O_5$ for the test disks, or $SiO_2$ for the comparison disk. The middle target was a CrPt alloy (for example, $Cr_{60}Pt_{40}$, $Cr_{52}Pt_{48}$ or $Cr_{56}Pt_{44}$, where the subscripts represent at. %) and the outer target was Co. Comparable results were also obtained on other target arrangements to produce the CoPtCr alloy, such as Co/CoCrPt, CoCr/Pt, CoCr/Cr, and CoCrPt/Pt. The typical composition for the RL was $Co_{49}$—$Pt_{11}$—$Cr_{10}$—$Ta_3$—$O_{27}$ (where the subscripts represent atomic percent) for the four test disks with Ta—Ox and $Co_{49}$—$Pt_{11}$—$Cr_{11}$—$Si_4$—$O_{25}$ for the comparison disks with Si—Ox. Thus the Ta—Ox test disks and the Si—Ox comparison disks had RLs of the same thickness (14 nm) and substantially the same amount of segregant and oxygen.

Figure 6:
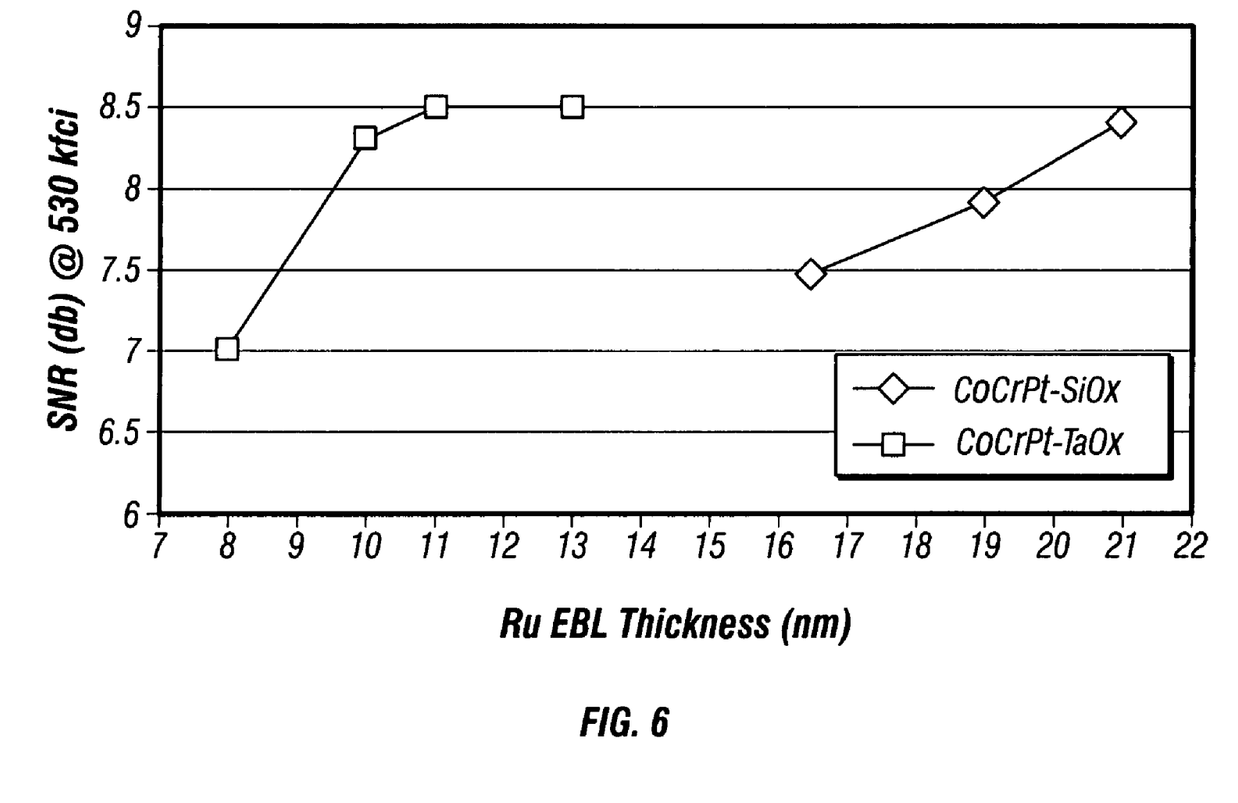
FIG. 6 is a graph of SNR(dB) as a function of EBL thickness for four Ta—Ox test disks and three Si—Ox comparison disks.

FIG. 6 is a graph of SNR(dB) at a linear recording density of 530 thousand flux changes/inch (kfci) as a function of Ru EBL thickness for four Ta—Ox test disks and three Si—Ox comparison disks. The Si—Ox comparison disk with the 21 nm Ru EBL had $H_c$ of 5580 Oe and $H_n$ of −1700 Oe. In contrast, the three Ta—Ox test disks with the 10-13 nm Ru EBLs had substantially the same SNR and comparable $H_c$ of 5230 Oe and $H_n$ of −1730 Oe.

Figure 7:
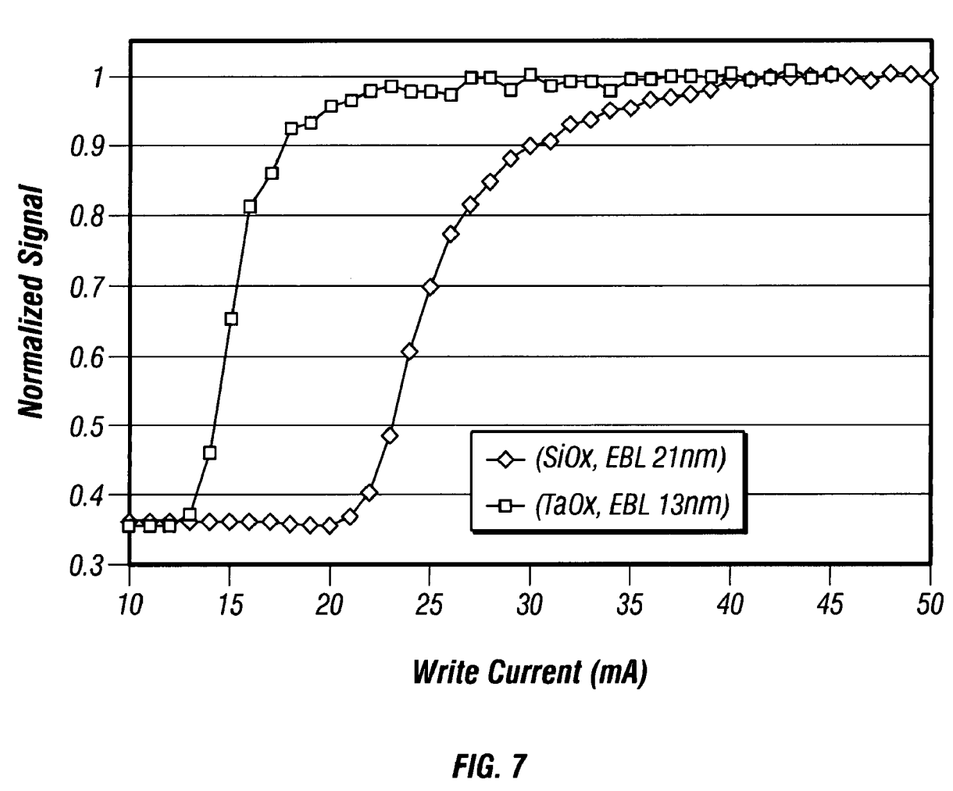
FIG. 7 is a comparison of the normalized readback signal for a low-density data pattern as a function of write current for a Ta—Ox test disk and a Si—Ox comparison disk.

FIG. 7 is a comparison of the normalized readback signal as a function of write current for the Ta—Ox test disk (13 nm Ru EBL) and the Si—Ox comparison disk (21 nm Ru EBL). FIG. 7 shows the improved writability of the Ta—Ox test disk. The Ta—Ox RL achieves saturation magnetization at a write current of approximately 20 mA compared to about 40 mA for the Si—Ox comparison disk. A lower write current means that the RL can be written with a smaller write field and that the write head can be made smaller.

Figure 8:
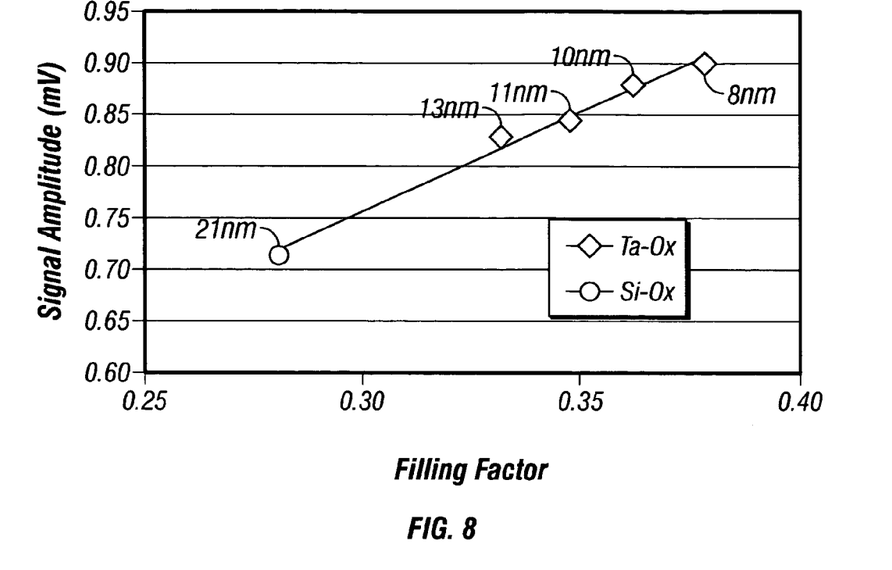
FIG. 8 is a graph of readback signal amplitude as a function of filling factor for four Ta—Ox test disks and the Si—Ox comparison disk.

FIG. 8 is a graph of readback signal amplitude as a function of filling factor for four Ta—Ox test disks and the Si—Ox comparison disk with the 21 nm Ru EBL. The readback signal is proportional to the filling factor, where the filling factor is the fractional part of the total head-to-SUL spacing that is occupied by the RL thickness. The Ta—Ox disks with 10-13 nm Ru EBLs have approximately a 20% higher readback signal amplitude than the Si—Ox disk with the 21 nm Ru EBL.

Figure 9:
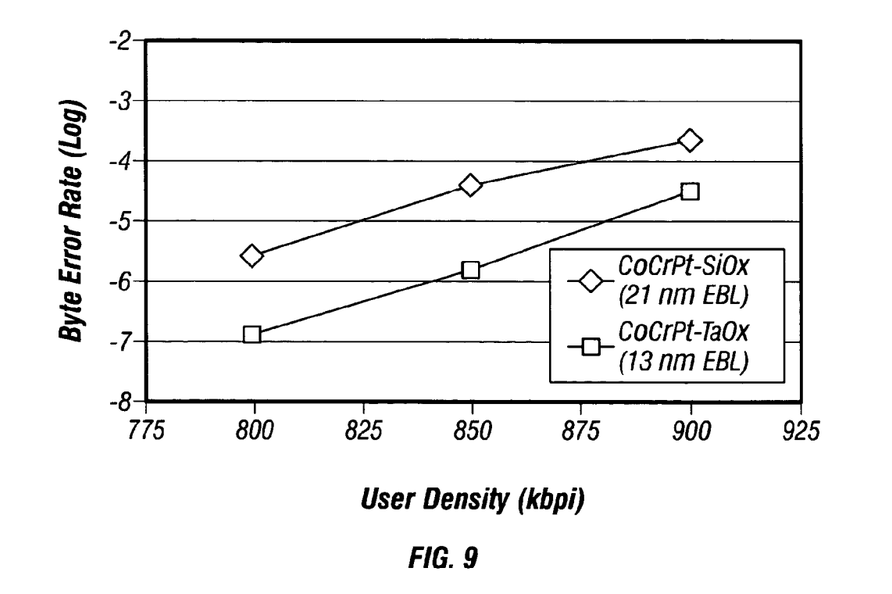
FIG. 9 is a graph of byte error rate as a function of linear recording density for the Ta—Ox disk and the Si—Ox comparison disk.

FIG. 9 shows the improved byte error rate for the Ta—Ox disk with 13 nm Ru EBL, as compared to the Si—Ox disk with the 21 nm Ru EBL.

The average RL grain size for the Ta—Ox disk with the 13 nm Ru EBL was significantly smaller than the Si—Ox disk with the 21 nm Ru EBL (approximately 6.0 nm vs. 7.1 nm), as determined by transmission electron microscopy (TEM) analysis. Smaller grains sharpen the magnetic transitions between magnetized regions in the RL, which improves the quality of the readback signal.

While the data described above was for Ta—Ox test disks, similar results have been obtained for Nb—Ox test disks with a typical composition of $CO_{50}$—$Pt_{11}$—$Cr_{11}$—$Nb_3$—$O_{25}$. Thus the invention is also applicable to perpendicular magnetic recording media with Nb—Ox in the RL and substantially thinner EBLs. The data described above was for EBLs formed of Ru. However, the invention is applicable with EBLs formed of other nonmagnetic hcp materials, including Ti, Re, and Os, and alloys containing at least one element selected from Ti, Re, Ru, and Os, including Ru-based alloys.

The data described above was for test disks with RLs of granular Co—Pt—Cr-M-Ox having relatively high amounts of oxygen, with the oxygen coming from both the oxide target and the $Ar/O_2$ sputtering gas mixture. Because the amount of oxygen in the RL is substantially greater than that required to form the stoichiometric M-O, substantial amounts of Cr oxides are also formed between the grains. RLs with Ta—Ox, Nb—Ox or Si—Ox and these relatively high levels of oxygen have been shown to produce the high values of $H_c$ and $H_n$ required for ultra-high density recording, as described in the previously-cited related pending application. The range of oxygen content in the RL that will produce RLs with $H_c$ greater than about 5000 Oe and $H_n$ greater (more negative) than about −1500 Oe was determined to be between about 22 and 35 at. %. The optimal segregant ranges for these high-oxygen RLs were determined to be about 2-9 at. % for Si, 2-5 at. % for Ta, and 2-5 at. % for Nb. Thus the above data shows that such high-oxygen Ta—Ox or Nb—Ox RLs can have values of $H_c$ and/or $H_n$ comparable to high-oxygen RLs with Si—Ox, but with substantially thinner EBLs. However, the present invention is not limited to RLs with these relatively high levels of oxygen. The invention is also applicable for disks with Ta—Ox or Nb—Ox RLs with lower values of $H_c$ and/or $H_n$ because such disks will have EBLs thinner than the EBLs required for disks with RLs having comparable values of $H_c$ and/or $H_n$ but having oxides of segregants other than Ta or Nb.

While the above data was demonstrated for single-layer RLs, as shown in FIG. 4, the RL may also be an AFC RL, like the type depicted in FIG. 3 and described in the previously-cited U.S. Pat. No. 6,815,082 B2. In the embodiment with the AFC RL and the reduced-thickness EBL, at least the upper ferromagnetic layer, or both the upper and lower ferromagnetic layers, would contain Ta or Nb.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording disk comprising:
   a substrate;
   an underlayer of magnetically permeable material on the substrate;
   a granular perpendicular magnetic recording layer consisting essentially only of Co, Pt, Cr, Ta and oxygen, wherein the amount of Ta present in the recording layer is greater than about 2 atomic percent and less than about 5 atomic percent, the recording layer having a hexagonal-close-packed (hcp) crystalline structure with the c-axis oriented substantially perpendicular to the recording layer and inter-granular material comprising oxides of Ta;
   an exchange-break layer between the underlayer and the recording layer for magnetically decoupling the recording layer and the underlayer, the exchange-break layer being a nonmagnetic hcp material selected from the group consisting of Ru and Ru-based alloys, the exchange-break layer having a thickness greater than 8 nm and less than 14 nm; and a seed layer between the underlayer and the exchange-break layer for encouraging the hcp growth of the exchange-break layer, the seed layer comprising an alloy of Ni and an element selected from the group consisting of Fe, V and W, the exchange-break layer being directly on and in contact with the seed layer;

wherein the recording layer has a coercivity $H_c$ greater than about 5000 Oe and a nucleation field $H_n$ more negative than about −1500 Oe.

2. A perpendicular magnetic recording system comprising: the disk of claim 1;

a write head for magnetizing regions in the recording layer of said disk; and a read head for detecting the transitions between said magnetized regions.

3. The disk of claim 1 wherein the amount of oxygen present in the recording layer is greater than about 22 atomic percent and less than about 35 atomic percent.

4. The disk of claim 1 wherein the recording layer is an antiferromagnetically-coupled (AFC) recording layer comprising first and second granular ferromagnetic alloy layers separated by a nonmagnetic antiferromagnetically-coupling layer, each of said first and second layers consisting essentially only of Co, Pt, Cr, Ta and oxygen, wherein the amount of Ta present in each of said first and second layers is greater than about 2 atomic percent and less than about 5 atomic percent and each of said first and second layers has a hexagonal-close-packed (hcp) crystalline structure with the c-axis oriented substantially perpendicular to the layer and intergranular material comprising oxides of Ta, said first layer being located between the exchange-break layer and said second layer, the AFC recording layer having a substantial net magnetic moment in the absence of an applied magnetic field.

5. The disk of claim 1 wherein the underlayer of magnetically permeable material is formed of a material selected from the group consisting of alloys of CoFe, CoNiFe, NiFe, FeCoB, CoCuFe, FeAlSi, FeTaN, FeN, FeTaC, CoTaZr and CoZrNb.

6. The disk of claim 1 wherein the underlayer of magnetically permeable material is a lamination of multiple magnetically permeable films separated by nonmagnetic films.

7. The disk of claim 6 wherein the nonmagnetic films in the lamination provide antiferromagnetic coupling of the magnetically permeable films in the lamination.

* * * * *